(12) United States Patent
Agrawal et al.

(10) Patent No.: US 11,941,960 B2
(45) Date of Patent: Mar. 26, 2024

(54) RADIO FREQUENCY PRESENCE ALERT SYSTEM

(71) Applicant: Carrier Corporation, Palm Beach Gardens, FL (US)

(72) Inventors: Piyush Agrawal, Cork (IE); Ankit Tiwari, South Windsor, CT (US); Blanca Florentino Liano, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 564 days.

(21) Appl. No.: 17/057,451

(22) PCT Filed: Jul. 12, 2019

(86) PCT No.: PCT/US2019/041525
§ 371 (c)(1),
(2) Date: Nov. 20, 2020

(87) PCT Pub. No.: WO2020/014562
PCT Pub. Date: Jan. 16, 2020

(65) Prior Publication Data
US 2021/0217284 A1    Jul. 15, 2021

Related U.S. Application Data

(60) Provisional application No. 62/697,449, filed on Jul. 13, 2018.

(51) Int. Cl.
*G08B 13/187* (2006.01)
*H04B 17/23* (2015.01)
(Continued)

(52) U.S. Cl.
CPC ........... *G08B 13/187* (2013.01); *H04B 17/23* (2015.01); *H04B 17/26* (2015.01); *H04B 17/318* (2015.01)

(58) Field of Classification Search
CPC ...... G08B 13/187; H04B 17/23; H04B 17/26; H04B 17/318; H04B 17/309
See application file for complete search history.

(56) References Cited

U.S. PATENT DOCUMENTS 7,333,481 B1 * 2/2008 Rawat ................. H04L 12/4641
370/352
8,111,156 B2   2/2012 Song et al.
(Continued)

FOREIGN PATENT DOCUMENTS

| CN | 106910308 A | 6/2017 |
| DE | 19921068 A1 | 11/2000 |
| JP | 2013257734 A | 12/2013 |

OTHER PUBLICATIONS

Habaebi, M. et al. Development of Physical Intrusion Detection System Using Wi-Fi/ZigBee RF Signals, Procedia Computer Science, 2015, vol. 76, pp. 541-552.
(Continued)

*Primary Examiner* — Brian E Miller
(74) *Attorney, Agent, or Firm* — CANTOR COLBURN LLP

(57) ABSTRACT

A presence alert system (24) includes a sniffer (36), controller-circuitry (38), radio frequency (RF) background data (40), and a software program (42). The sniffer is configured to sample and measure a characteristic of ambient RF signals (33) over time. The controller-circuitry includes one or more processors and one or more storage mediums. The RF background data is stored in at least one of the one or more storage mediums, and is indicative of no moving presence. The software program is stored in at least one of the one or more storage mediums, and is executed by at least one of the one or more processors. The software program is configured to evaluate the measured characteristic of the ambient RF signals, compare the measured characteristic to
(Continued)

the RF background data, and thereby determine motion of a presence (34).

15 Claims, 2 Drawing Sheets

(51) Int. Cl.
*H04B 17/26* (2015.01)
*H04B 17/318* (2015.01)

(56) References Cited

U.S. PATENT DOCUMENTS

| | | | |
|---|---|---|---|
| 8,223,878 B2 | 7/2012 | Murakami et al. | |
| 8,354,925 B1* | 1/2013 | Libby | G08B 13/187 |
| | | | 340/567 |
| 8,710,983 B2 | 4/2014 | Malkowski | |
| 8,819,824 B2 | 8/2014 | Christofferson et al. | |
| 8,836,344 B2 | 9/2014 | Habib et al. | |
| 9,378,634 B1* | 6/2016 | Kashyap | H04B 17/318 |
| 9,520,041 B2 | 12/2016 | Rosa et al. | |
| 9,659,474 B1* | 5/2017 | Kashyap | G08B 13/2491 |
| 9,693,181 B1 | 6/2017 | Albouyeh et al. | |
| 9,786,138 B1 | 10/2017 | Kashyap et al. | |
| 10,498,467 B1* | 12/2019 | Ravkine | H04W 76/34 |
| 2005/0259611 A1* | 11/2005 | Bhagwat | H04W 12/03 |
| | | | 370/328 |
| 2006/0002331 A1* | 1/2006 | Bhagwat | H04L 69/163 |
| | | | 370/328 |
| 2008/0109879 A1* | 5/2008 | Bhagwat | H04W 12/122 |
| | | | 726/3 |
| 2008/0143529 A1 | 6/2008 | Gauvreau | |
| 2012/0146788 A1* | 6/2012 | Wilson | G08B 13/187 |
| | | | 340/539.23 |
| 2014/0140231 A1* | 5/2014 | Haiut | G01S 13/003 |
| | | | 370/252 |
| 2015/0339912 A1* | 11/2015 | Farrand | G08B 25/006 |
| | | | 340/501 |
| 2016/0078698 A1* | 3/2016 | Moses | G08B 25/14 |
| | | | 340/5.23 |
| 2016/0127926 A1* | 5/2016 | Xie | G06F 3/0484 |
| | | | 455/67.7 |
| 2016/0284186 A1* | 9/2016 | Pavlich | H04W 4/023 |
| 2017/0048800 A1* | 2/2017 | Tal | H04W 64/00 |
| 2017/0132888 A1 | 5/2017 | Conlon et al. | |
| 2018/0040209 A1 | 2/2018 | Lim | |
| 2019/0090215 A1* | 3/2019 | Norton | H04B 17/318 |
| 2019/0146076 A1* | 5/2019 | Kravets | H04W 72/23 |
| | | | 455/67.11 |
| 2019/0213857 A1* | 7/2019 | Ghourchian | G08B 13/2491 |
| 2020/0223393 A1* | 7/2020 | Lin | G06N 3/084 |
| 2021/0097835 A1* | 4/2021 | Stimek | G08B 25/10 |
| 2021/0217284 A1* | 7/2021 | Agrawal | H04B 17/23 |
| 2021/0341508 A1* | 11/2021 | George | G01J 5/026 |

OTHER PUBLICATIONS

International Search Report for International Application No. PCT/US2019/041525; Date of Completion: Sep. 11, 2019; dated Sep. 19, 2019; 7 Pages.

Written Opinion of the International Searching Authority for International Application No. PCT/US2019/041525; International Filing Date: Jul. 12, 2019; dated Sep. 19, 2019; 10 Pages.

* cited by examiner

RADIO FREQUENCY PRESENCE ALERT SYSTEM

CROSS-REFERENCE TO RELATED APPLICATIONS

This application is a Non-Provisional Application of PCT/US2019/041525 filed Jul. 12, 2019, which claims the benefit of U.S. Provisional Application No. 62/697,449 filed Jul. 13, 2018, the disclosure of which is incorporated herein by reference in its entirety.

BACKGROUND

The present disclosure relates to a presence alert system, and more particularly, to a radio frequency presence alert system.

Presence or intrusion detection is typically performed by motion detectors, which come in many forms including optical and thermal/infrared cameras, passive/active infrared motion detectors, acoustic sensors, vibration sensors, window magnetic sensors and/or glass break sensors. The most common motion sensor used for intrusion detection is passive infrared sensors (PIRs), which rely on sensing the heat radiated by human bodies. The PIRs may be deployed at entrance or transition points in a building through which an intruder may enter.

More recently, research and advancements have developed motion and/or presence sensing techniques that exploit changes in the radio frequency electromagnetic fields (i.e., often called RF fields) generated by wireless devices. Some systems include multiple wireless nodes/transceivers, where each node can determine changes in the signal strength and/or link quality of a specific coded or a generic RF signal received from other nodes. Decision logic, then, determines motion/presence. Other systems are based on a single transmitter and receiver to determine motion and/or presence in an area, either using a single direction measurement, or bi-directional measurements. Unfortunately, these systems rely on the deployment of specific devices for generation and sampling of the RF field. Such deployment may contribute toward deployment costs.

BRIEF DESCRIPTION

A building system according to one exemplary, non-limiting, embodiment of the present disclosure includes a wireless radio device and a presence alert system. The wireless radio device includes a transmitting component configured to transmit a radio frequency (RF), and a receiving component configured to receive the RF to accomplish a primary task. The presence alert system is configured to perform a presence alert task, the presence alert system including a sniffer configured to sample and measure a characteristic of the RF signals over time, controller-circuitry including one or more processors and one or more storage mediums, RF background data stored in at least one of the one or more storage mediums and indicative of no moving presence, a software program stored in at least one of the one or more storage mediums and executed by at least one of the one or more processors, wherein the software program is configured to evaluate the measured characteristic of the RF signals, compare the measured characteristic to the RF background data, and thereby determine motion of a presence.

Additionally to the foregoing embodiment, the transmitting device, the receiving device, and the sniffer are located in a building.

In the alternative or additionally thereto, in the foregoing embodiment, the sniffer is one of a plurality of sniffers each located in a respective region of a plurality of regions of the building.

In the alternative or additionally thereto, in the foregoing embodiment, the wireless radio device is one of a plurality of wireless radio devices each transmitting respective RF signals sampled by the sniffer.

In the alternative or additionally thereto, in the foregoing embodiment, the plurality of wireless radio devices is a network configured to communicate in one of a mesh topology and a star topology.

In the alternative or additionally thereto, in the foregoing embodiment, the measured characteristic includes signal strength.

In the alternative or additionally thereto, in the foregoing embodiment, the measured characteristic includes CSI.

In the alternative or additionally thereto, in the foregoing embodiment, the wireless radio device is stationary.

In the alternative or additionally thereto, in the foregoing embodiment, the wireless radio device is a WIFI device.

In the alternative or additionally thereto, in the foregoing embodiment, the wireless radio device is a ZIGBEE device.

In the alternative or additionally thereto, in the foregoing embodiment, the wireless radio device is an IBEACON.

In the alternative or additionally thereto, in the foregoing embodiment, the plurality of wireless devices include one or more of a WIFI device, a ZIGBEE device, and an IBEACON.

In the alternative or additionally thereto, in the foregoing embodiment, the software program is configured to evaluate temporal variations in the RF signals attributed to motion and extracts features that capture motion of the presence and that is invariant to RF background change.

In the alternative or additionally thereto, in the foregoing embodiment, the presence alert system is an intruder alert system.

A presence alert system according to another, non-limiting, embodiment comprises a sniffer configured to sample and measure a characteristic of ambient radio frequency (RF) signals over time; controller-circuitry including one or more processors and one or more storage mediums; RF background data stored in at least one of the one or more storage mediums and indicative of no moving presence; and a software program stored in at least one of the one or more storage mediums and executed by at least one of the one or more processors, wherein the software program is configured to evaluate the measured characteristic of the ambient RF signals, compare the measured characteristic to the RF background data, and thereby determine motion of a presence.

Additionally to the foregoing embodiment, the presence alert system does not generate the ambient RF signals.

In the alternative or additionally thereto, in the foregoing embodiment, the sniffer is one of a plurality of sniffers each located in a respective region of a plurality of regions of a building.

In the alternative or additionally thereto, in the foregoing embodiment, the measured characteristic includes signal strength.

In the alternative or additionally thereto, in the foregoing embodiment, the software program is configured to evaluate temporal variations in the RF signals attributed to motion and extracts features that capture motion of the presence and that is invariant to RF background change.

A method of commissioning a presence alert system according to another, non-limiting, embodiment comprises collecting measurements of characteristics of an ambient RF signal by an RF sniffer; storing the measurements in a site-specific database; and inferring variations in the characteristics of the ambient RF signal by a machine learning algorithm executed by a processor and indicative of a moving presence within a region.

The foregoing features and elements may be combined in various configurations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

In the present disclosure, intrusion detection is built on existing wireless sensors previously deployed in the building. Since radio frequency (RF) signals are increasingly available because of the penetration of wireless IoT devices, especially in indoor building automation, the present disclosure proposes to leverage the ambient RF field generated by devices that are previously deployed and not specifically for intrusion detection purposes. A decision system is presented that determines the devices that are suitable for the purposes of motion and/or intrusion detection.

In addition, more traditional systems may entail wireless nodes deployed around an area of interest (e.g., a room or a house perimeter). However, these systems may not address the false alarm issues that arise from movements outside the area of interest. In the present disclosure, such issues are addressed by a methodology that explicitly determines the area of interest in any arbitrary deployment. Furthermore, the present disclosure incorporates a machine learning and/or neural network routine that learns the variations in the RF field corresponding to the movement within the area of interest. The machine learning and/or neural network routine, consequently, can reject false alarms caused by movements outside the area of interest.

Figure 1:
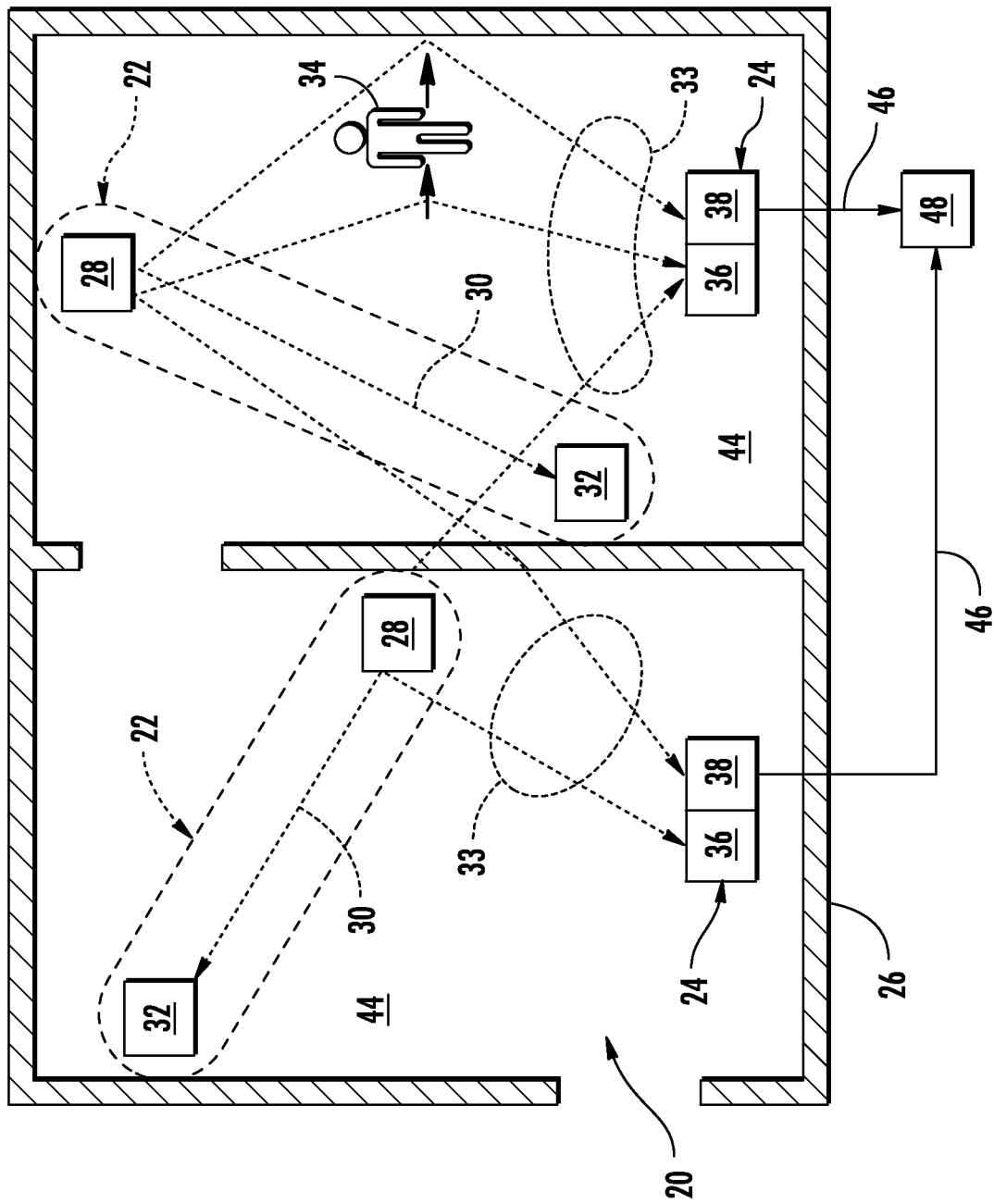
FIG. 1 is a schematic of a building system utilizing a presence alert system as one, non-limiting, exemplary embodiment of the present disclosure.

Referring to FIG. 1, an exemplary embodiment of a building system 20 (e.g., wireless communications system) includes one or more commodity wireless radio devices, or links, 22 (i.e., two illustrated in FIG. 1) and one or more presence detection systems 24 (i.e., two illustrated in FIG. 1) that applies radio frequency sensing. The commodity wireless radio devices 22 and the presence detection system 24 are generally located in, or proximate too, a building 26. Each commodity wireless radio device 22 is generally stationary, and may include a transmitting component 28 configured to transmit a radio frequency (RF) signal (see arrow 30) and a receiving component 32 configured to receive the RF signal 30. Non-limiting examples of the wireless radio devices 22 and the associated RF signals 30 include WIFI devices, ZIGBEE devices, IBEACONS, and others. Non-limiting applications of the commodity wireless radio device 22 may include a wireless phone, an entertainment system, a television system, and any other type of wireless, RF, system typically used in, or proximate too, the building 26.

Each respective commodity wireless radio device 22 is constructed to perform a respective primary task, and the respective RF signals 30 enable the accomplishment of such primary tasks. For example, a wireless television system may stream a movie from a transmitting component 28 (e.g., router) and to a receiving component 32 (e.g., a smart television). In another example, a telephone system may transmit verbal communications as the RF signal 30, and from a transmitting component 28 (e.g., power charger base) and to a receiving component 32 (e.g., hand-held phone). All of the RF signals 30, taken together in a given space, amount to an ambient RF signal 33 having various characteristics such as signal strength, channel state information (CSI), and others. In one embodiment, the plurality of commodity wireless radio devices 22 is a network configured to communicate in one of a mesh topology and a star topology.

The presence detection system 24 is configured to leverage the ambient RF signal 33 by generally detecting variations in prescribed characteristics of the ambient RF signal indicative of a moving presence 34. That is, the ambient RF signal 33 is generally leveraged to serve a dual purpose, the primary task when applied to one or more of the wireless radio devices 22 (as previously described with regard to signal 32), and a presence alert task when applied to the presence detection system 24. In one, non-limiting, example, the presence 34 may be a human intruder and the presence detection system 24 may be an intrusion detection system.

Figure 2:
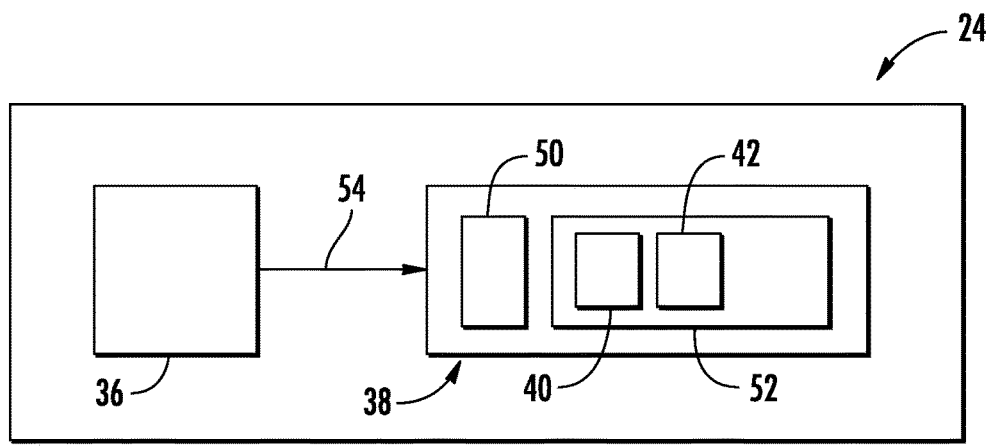
FIG. 2 is a schematic of the presence alert system.

Referring to FIGS. 1 and 2, the presence alert system 24 includes one or more RF sniffers 36 (i.e., two illustrated), controller-circuitry 38, RF data 40 (e.g., RF background data), and prescribed instructions 42 (i.e., software program). An RF sniffer may be a RF device that measures physical characteristics of the received RF signal, such as signal strength, CSI, and others. A non-limiting example of a RF sniffer is a WIFI network interface card. Each RF sniffer 36 is located in a respective region 44 of the building 26. For example, the regions 44 may be individual rooms, or, a first region may be an area proximate to a first entry door, and a second region may be an area proximate to a second entry door of the same building 26. Each RF sniffer 36 is configured to sample and measure characteristics of the ambient RF signals 33 in the respective region 44.

It is understood, that an RF signal strength of the same RF signal 32 may be different from one region 44 to the next region due to, for example, attenuation (i.e., traveling through objects like walls) and/or distance from the transmitting component 28. The region 44 is defined and configured during the commissioning of the system. In one embodiment, the installer may traverse the corners of the region and let the RF sniffer 36 collect measurements of the characteristics of the ambient RF signal 33. This could be stored in a site-specific database and a machine learning algorithm infers if the variations in the characteristics of ambient RF signal 33 is indicative of a moving presence 34 that is within the configured region 44. The characteristics of the ambient RF signals 32 are further measured over time, because such measurements may differ over time depending upon, for example, the usage of the wireless radio devices 22.

In one embodiment and as illustrated in FIG. 1, the controller-circuitry 38 may be located in each one of the sniffers 36 as a single, self-contained, unit. In another embodiment, each sniffer 36 may communicate with a single controller-circuitry 38 that may be located in the building 26, or remotely located. Upon the detection of the moving presence, the controller-circuitry 38 may output a notification signal (see arrow 46 in FIG. 1) to a notification device 48 for notification to a user, government authority, and/or others.

The controller circuitry 38 may include one or more processors 50 (e.g., microprocessor) and one or more storage mediums 52 that may be computer writeable and readable. The RF data 40 and the instructions 42 are stored in the storage medium 52. In operation, the RF data 40 is used by the processor 50 along with an input signal (see arrow 54 in FIG. 2) indicative of the measured ambient RF signal 33 when executing the instructions 42 to determine the existence of the moving presence 34 within the region of interest 44. In one embodiment, the RF data 40 may include RF background data that is indicative of no moving presence. The RF background data may be learned by the processor 50 via, for example, machine learning algorithms as part of the instructions 42. The RF data may include features that allow determining if the ambient RF signal 33 is generated by a transmitting component 28 that is stationary either by matching the MAC address or by looking at the temporal variations of the RF data 40 or both. The RF data 40 may further include extracted features associated with the signal characteristics that are attributed to motion of a presence 34, which may be invariant to RF background changes (i.e., temporal variation in the ambient RF signals 33 attributed to motion).

Figure 3:
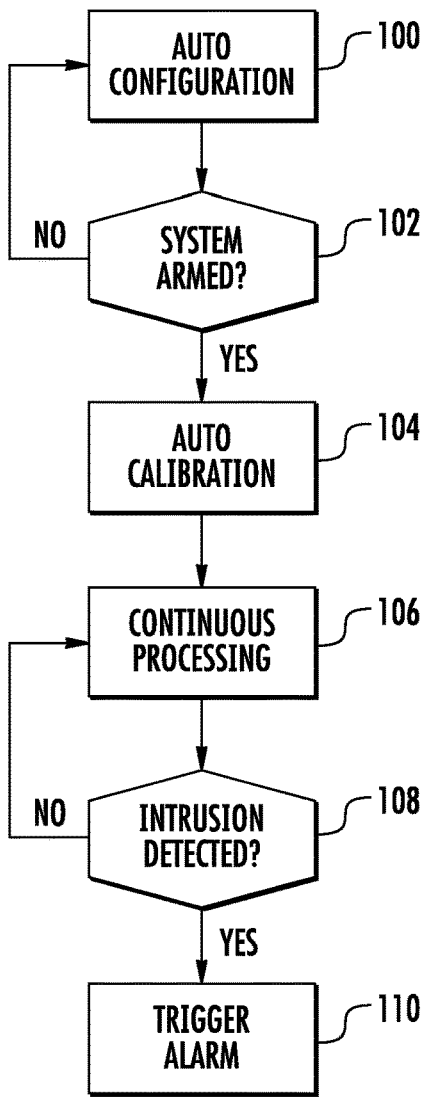
FIG. 3 is a flow chart of a method of operating the presence alert system.

Referring to FIG. 3, and in operation, the presence detection system 24 when initialized may be in an auto configuration at block 100. At block 102, the controller-circuitry 38 may determine if the system is armed. If no, the system loops back to apply block 102 again. If the system is armed, and at block 104, the controller-circuitry 38 applies an auto calibration that entails self-learning of the RF background data and extracted features previously described. At block 106, the system may continuously monitor for a moving presence 34 within the region of interest 44 by generally comparing the measured ambient RF signal 33 to the RF background data and/or extracted features stored as part of the RF data 40. At block 108, and based on this comparison, the controller circuitry 38 determines if a moving presence is detected. If not, the system loops back to block 106. If a moving presence is detected, and at block 110, the controller circuitry 38 may affect the triggering of an alarm via the notification device 48.

The various functions described above may be implemented or supported by a computer program that is formed from computer readable program codes and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, module, system, and the like are intended to refer to a computer-related entity, either hardware, a combination of hardware and software, or software execution. By way of example, a component may be, but is not limited to, a process running on a processor, a processor, an object, an executable, a thread of execution, a program, and/or a computer. It is understood that an application running on a server and the server may be a component. One or more components may reside within a process and/or thread of execution and a component may be localized on one computer and/or distributed between two or more computers Advantages and benefits of the present discloser include an RF presence alert system configured to sense and utilize pre-existing RF signals. Another advantage is a plug-and-play capability of the system with minimal effort by the user. Yet another advantage is the ability to compliment an already installed intrusion detection system by providing whole building coverage by leveraging the transmission used for data/voice communication.

While the present disclosure is described with reference to exemplary embodiments, it will be understood by those skilled in the art that various changes may be made and equivalents may be substituted without departing from the scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A building system comprising:
   a wireless radio device including a transmitting component configured to transmit a radio frequency (RF), and a receiving component configured to receive the RF to accomplish a primary task; and
   a presence alert system configured to perform a presence alert task, the presence alert system including a sniffer configured to sample and measure a characteristic of the RF signals over time, controller-circuitry including one or more processors and one or more storage mediums, RF background data stored in at least one of the one or more storage mediums and indicative of no moving presence, a software program stored in at least one of the one or more storage mediums and executed by at least one of the one or more processors, wherein the software program is configured to evaluate the measured characteristic of the RF signals, compare the measured characteristic to the RF background data, and thereby determine motion of a presence.

2. The building system set forth in claim 1, wherein the transmitting device, the receiving device, and the sniffer are located in a building.

3. The building system set forth in claim 2, wherein the sniffer is one of a plurality of sniffers each located in a respective region of a plurality of regions of the building.

4. The building system set forth in claim 2, wherein the wireless radio device is one of a plurality of wireless radio devices each transmitting respective RF signals sampled by the sniffer.

5. The building system set forth in claim 4, wherein the plurality of wireless radio devices is a network configured to communicate in one of a mesh topology and a star topology.

6. The building system set forth in claim 1, wherein the measured characteristic includes signal strength.

7. The building system set forth in claim 6, wherein the measured characteristic includes CSI.

8. The building system set forth in claim 1, wherein the wireless radio device is stationary.

9. The building system set forth in claim 1, wherein the software program is configured to evaluate temporal variations in the RF signals attributed to motion and extracts features that capture motion of the presence and that is invariant to RF background change.

10. The building system set forth in claim 1, wherein the presence alert system is an intruder alert system.

11. A presence alert system comprising:
a sniffer configured to sample and measure a characteristic of ambient radio frequency (RF) signals over time;
controller-circuitry including one or more processors and one or more storage mediums;
RF background data stored in at least one of the one or more storage mediums and indicative of no moving presence; and
a software program stored in at least one of the one or more storage mediums and executed by at least one of the one or more processors, wherein the software program is configured to evaluate the measured characteristic of the ambient RF signals, compare the measured characteristic to the RF background data, and thereby determine motion of a presence.

12. The presence alert system set forth in claim 11, wherein the presence alert system does not generate the ambient RF signals.

13. The presence alert system set forth in claim 12, wherein the sniffer is one of a plurality of sniffers each located in a respective region of a plurality of regions of a building.

14. The presence alert system set forth in claim 12, wherein the measured characteristic includes signal strength.

15. The presence alert system set forth in claim 12, wherein the software program is configured to evaluate temporal variations in the RF signals attributed to motion and extracts features that capture motion of the presence and that is invariant to RF background change.

* * * * *